US011436416B2

(12) United States Patent
Beaver

(10) Patent No.: US 11,436,416 B2
(45) Date of Patent: Sep. 6, 2022

(54) AUTOMATED CONVERSATION REVIEW TO SURFACE VIRTUAL ASSISTANT MISUNDERSTANDINGS

(71) Applicant: Verint Americas Inc., Alpharetta, GA (US)

(72) Inventor: Ian Beaver, Spokane, WA (US)

(73) Assignee: VERINT AMERICAS INC., Alpharetta, GA (US)

( * ) Notice: Subject to any disclaimer, the term of this patent is extended or adjusted under 35 U.S.C. 154(b) by 0 days.

(21) Appl. No.: 16/892,483

(22) Filed: Jun. 4, 2020

(65) Prior Publication Data

US 2020/0387673 A1 Dec. 10, 2020

Related U.S. Application Data

(60) Provisional application No. 62/858,031, filed on Jun. 6, 2019.

(51) Int. Cl.
 *G06F 40/35* (2020.01)
 *G06F 16/9032* (2019.01)
 *G06K 9/62* (2022.01)

(52) U.S. Cl.
 CPC ........ *G06F 40/35* (2020.01); *G06F 16/90332* (2019.01); *G06K 9/6263* (2013.01)

(58) Field of Classification Search
 CPC .. G06F 40/35; G06F 16/90332; G06K 9/6263
 See application file for complete search history.

(56) References Cited

U.S. PATENT DOCUMENTS

| 4,914,590 | A | 4/1990 | Loatman et al. |
|---|---|---|---|
| 10,175,865 | B2 | 1/2019 | Beaver et al. |
| 10,545,648 | B2 | 1/2020 | Beaver et al. |
| 2004/0148154 | A1 | 7/2004 | Acero et al. |
| 2007/0143485 | A1 | 6/2007 | Da Palma et al. |
| 2009/0306967 | A1 | 12/2009 | Nicolov et al. |
| 2013/0110928 | A1 | 5/2013 | Ghosh et al. |
| 2014/0095147 | A1 | 4/2014 | Hebert et al. |
| 2014/0136185 | A1 | 5/2014 | Bhatt |
| 2014/0163959 | A1 | 6/2014 | Hebert et al. |

(Continued)

OTHER PUBLICATIONS

Aberdeen, J., et al., "Dialogue Patterns and Misunderstandings," ISCA Tutorial and Research Workshop on Error Handling in Spoken Dialogue Systems, 2003, 5 pages.

(Continued)

*Primary Examiner* — Sonia L Gay
(74) *Attorney, Agent, or Firm* — Meunier Carlin & Curfman LLC

(57) ABSTRACT

A scalable system provides automated conversation review that can identify potential miscommunications. The system may provide suggested actions to fix errors in intelligent virtual assistant (IVA) understanding, may prioritize areas of language model repair, and may automate the review of conversations. By the use of an automated system for conversation review, problematic interactions can be surfaced without exposing the entire set of conversation logs to human reviewers, thereby minimizing privacy invasion. A scalable system processes conversations and autonomously marks the interactions where the IVA is misunderstanding the user.

18 Claims, 8 Drawing Sheets

(56) References Cited

U.S. PATENT DOCUMENTS

| | | | | |
|---|---|---|---|---|
| 2014/0365226 | A1* | 12/2014 | Sinha | G10L 15/22 704/275 |
| 2015/0348549 | A1 | 12/2015 | Giuli et al. | |
| 2016/0071517 | A1* | 3/2016 | Beaver | G10L 15/22 704/9 |
| 2017/0048109 | A1 | 2/2017 | Kant et al. | |
| 2017/0068670 | A1 | 3/2017 | Orr et al. | |
| 2017/0162197 | A1 | 6/2017 | Cohen | |
| 2017/0249389 | A1 | 8/2017 | Brovinsky et al. | |
| 2018/0052910 | A1 | 2/2018 | Allen et al. | |
| 2018/0075251 | A1 | 3/2018 | Van Hoof et al. | |
| 2018/0226067 | A1* | 8/2018 | Dhoolia | G10L 15/18 |
| 2018/0314689 | A1 | 11/2018 | Wang et al. | |
| 2019/0213999 | A1* | 7/2019 | Grupen | G06F 3/167 |

OTHER PUBLICATIONS

Bagheri, A., et al., "Care more about customers: Unsupervised domain-independent aspect detection for sentiment analysis of customer reviews," Knowledge-Based Systems, vol. 52, 2013, pp. 201-213.

Beaver, I., et al., "An Annotated Corpus of Relational Strategies in Customer Service," arXiv.org, Cornell University Library, XP080953431, 2017, 19 pages.

Beaver, I., et al., "Prioritization of Risky Chats for Intent Classifier Improvement," Proceedings of the 29th International Florida Artificial Intelligence Research Society Conference, vol. 29, 2016, pp. 167-172.

Bhaskar, J., et al., "Hybrid Approach for Emotion Classification of Audio Conversation Based on Text and Speech Mining," International Conference on Information and Communication Technologies (ICICT 2014), Procedia Computer Science, vol. 46, 2015, pp. 635-643.

Brill, E., "Transformation-Based Error-Driven Learning and Natural Language Processing: A Case Study in Part-of-Speech Tagging," Association for Computational Linguistics, 1995, 24 pages.

Bulyko, I., et al., "Error-correction detection and response generation in a spoken dialogue system," Speech Communication, vol. 45, No. 3, 2005, pp. 271-288.

Clark, H., et al., "Referring as a collaborative process," Cognition, vol. 22, Issue 1, 1986, 39 pages.

Correa, T., et al., "Who interacts on the Web?: The intersection of users' personality and social media use," Computers in Human Behavior, vol. 26, No. 2, 2010, pp. 247-253.

Dumoulin, J., "Using Multiple Classifiers to Improve Intent Recognition in Human Chats," MAICS, 2014, 6 pages.

Freeman, C., et al., "Online Proactive Escalation in Multi-Modal Automated Assistants," Florida Artificial Intelligence Research Society Conference, vol. 30, 2017, pp. 215-220.

Gamon, M., "Sentiment classification on customer feedback data: noisy data, large feature vectors, and the role of linguistic analysis," Proceedings of the 20th international conference on Computational Linguistics, 2004, 7 pages.

Hirschberg, J., et al., "Generalizing Prosodic Prediction of Speech Recognition Errors," Interspeech, 2000, pp. 254-257.

Hochreiter, S., et al., "Long Short-term Memory," Neural Computation, vol. 9, No. 8, 1997, pp. 1735-1780.

Jiang, J., et al., "Automatic Online Evaluation of Intelligent Assistants," Proceedings of the 24th International Conference on World Wide Web, 2015, pp. 506-516.

Johnston, M., et al., "The Multimodal Virtual Assistant," Proceedings of the 15th Annual Meeting of the Special Interest Group on Discourse and Dialogue (SIGDIAL), 2014, pp. 257-259.

Kang, D., et al., "Review-based measurement of customer satisfaction in mobile service: Sentiment analysis and VIKOR approach," Expert Systems with Applications, vol. 41, No. 4, 2014, pp. 1041-1050.

Khatri, C., et al., "Advancing the State of the Art in Open Domain Dialog Systems through the Alexa Prize," arXiv preprint arXiv:1812, 2018, 12 pages.

Kim, Y.-B., et al., "*Onenet*: Joint Domain, Intent, Slot Prediction for Spoken Language Understanding," IEEE Automatic Speech Recognition and Understanding Workshop (ASRU), 2017, 7 pages.

Kim, B., et al., "Two-stage multi-intent detection for spoken language understanding," Multimedia Tools and Applications, 2016, 14 pages.

Kim, W., "Using Prosody for Automatically Monitoring Human-Computer Call Dialogues," Psychology, 2008, pp. 79-82.

Krahmer, E., et al., "Problem spotting in human-machine interaction," Eurospeech, 1999, pp. 1423-1426.

Kuhn, R., et al., "The Application of Semantic Classification Trees to Natural Language Understanding," IEEE Transactions on Pattern Analysis and Machine Intelligence, vol. 17, No. 5, 1995, pp. 449-460.

Kuligowska, K, "Commercial Chatbot: Performance Evaluation, Usability Metrics and Quality Standards of Embodied Conversational Agents," Professionals Center for Business Research, 2015, 16 pages.

Lendvai, P., "Improving Machine-Learned Detection of Miscommunications in Human-Machine Dialogues Through Informed Data Splitting," Proceedings of the ESSLLI Workshop on Machine Learning Approaches in Computational Linguistics, Citeseer, 2002, 15 pages.

Lendvai, P., "Multi-feature Error Detection in Spoken Dialogue Systems," Language and Computers, vol. 45, No. 1, 2001, 16 pages.

Lison, P., "Structured Probabilistic Modelling for Dialogue Management," Ph.D. Thesis, Department of Informatics, Faculty of Mathematics and Natural Sciences, University of Oslo, Oct. 30, 2013, 250 pages.

Lu, X., "Automatic analysis of syntactic complexity in second language writing," International Journal of Corpus Linguistics, vol. 15, Issue 4, 2010, pp. 474-496.

Maas, A., et al., "Learning Word Vectors for Sentiment Analysis," Proceedings of the 49th Annual Meeting of the Association for Computational Linguistics: Human Language Technologies, vol. 1, 2011, pp. 142-150.

Mikolov, T., et al., "Efficient Estimation of Word Representations in VectorSpace," arXiv preprint arXiv:1301.3781, 2013, 12 pages.

Ogawa, A., et al., "ASR Error Detection and Recognition Rate Estimation Using Deep Bidirectional Recurrent Neural Networks," IEEE International Conference on Acoustics, Speech and Signal Processing (ICASSP), 2015, pp. 4370-4374.

Pallotta, V., et al., "Interaction Mining: the new frontier of Customer Interaction Analytics," Studies in Computational Intelligence, vol. 439, 2013, pp. 91-111.

Pradhan, S. S., et al., "Estimating Semantic Confidence for Spoken Dialogue Systems," International Conference on Acoustics, Speech, and Signal Processing (ICASSP), 2002, vol. 1, 4 pages.

Ram, A., et al. "Conversational AI: The Science Behind the Alexa Prize," arXiv preprint arXiv:1801.03604, 2018, 18 pages.

Ratnaparkhi, A., "A Maximum Entropy Model for Part-of-Speech Tagging," Conference on Empirical Methods in Natural Language Processing (EMNLP), 1996, 10 pages.

Roy, S., et al., "$QA^{RT}$: A System for Real-Time Holistic Quality Assurance for Contact Center Dialogues," Proceedings of the Thirtieth AAAI Conference on Artificial Intelligence (AAAI-16), 2016, pp. 3768-3775.

Sarma, A., et al., "Context-based Speech Recognition Error Detection and Correction," Proceedings of HLT-NAACL 2004: Short Papers, Association for Computational Linguistics, 2004, 4 pages.

Szumilas, M., "Explaining Odds Ratios," Journal of the Canadian Academy of Child and Adolescent Psychiatry, vol. 19, No. 3, 2010, pp. 227-229.

Tam, Y.-C., et al., "ASR error detection using recurrent neural network language model and complementary ASR," International Conference on Acoustics, Speech and Signal Processing (ICASSP), 2014, pp. 2331-2335.

Van Asch, V., "Macro- and micro-averaged evaluation measures," 2013, 27 pages.

(56) References Cited

OTHER PUBLICATIONS

Wen, T.-H., et al., "Multi-domain Neural Network Language Generation for Spoken Dialogue Systems," Proceedings of NAACL-HLT, arXiv preprint arXiv:1603.01232, 2016, pp. 120-129.

Wessel, F., et al., "Confidence Measures for Large Vocabulary Continuous Speech Recognition," IEEE Transactions on Speech and Audio Processing, vol. 9, No. 3, 2001, 33 pages.

Xu, H., et al., "LLT-PolyU: Identifying Sentiment Intensity in Ironic Tweets," Proceedings of the 9th International Workshop on Semantic Evaluation (SemEval 2015), Association for Computational Linguistics, 2015, pp. 673-678.

Zhao, T., et al., "Towards End-to-End Learning for Dialog State Tracking and Management using Deep Reinforcement Learning," arXiv preprint arXiv:1606.02560, 2016, 10 pages.

International Preliminary Report on Patentability and Written Opinion, dated Dec. 16, 2021, received in connection with corresponding International Patent Application No. PCT/US2020/036062.

International Search Report and Written Opinion, dated Sep. 9, 2020, received in connection with corresponding International Patent Application No. PCT/US2020/036062.

\* cited by examiner

FIG. 7

AUTOMATED CONVERSATION REVIEW TO SURFACE VIRTUAL ASSISTANT MISUNDERSTANDINGS

CROSS-REFERENCE TO RELATED APPLICATIONS

This application claims the benefit of priority to U.S. Provisional Patent Application No. 62/858,031, filed on Jun. 6, 2019, entitled "AUTOMATED CONVERSATION REVIEW FOR VIRTUAL ASSISTANT MISUNDERSTANDINGS USING HUMAN-IN-THE-LOOP," the contents of which are hereby incorporated by reference in its entirety.

BACKGROUND

Intelligent virtual assistants (IVAs) along with specialized agents for customer service and sales support are exploding in popularity. The continued adoption of IVAs is contributing to a growing problem directed to refining an IVA's knowledge effectively and efficiently. As IVA use as well as the number of tasks an IVA is expected to perform increases, there is a corresponding jump in the number of human-computer interactions to be reviewed for quality assurance. Therefore, discovering a means to expedite review and analysis of these interactions is critical.

Without scalable and efficient methods of automated conversation review, IVA designers must rely solely on human reviewers to validate expected behavior of the IVAs. As this is a manual and time consuming process, the reviewers are only able to view a limited number of interactions. The result is also subjective since reviewers may disagree on the user intention for any given turn in a conversation. In addition, as the IVA improves, errors in communication appear less often in a random sample due to their dwindling numbers. A recent challenge is public outcry over the human review of IVA conversation logs for the purpose of language understanding verification, due to privacy concerns.

SUMMARY

A scalable system provides automated conversation review that can identify potential miscommunications. The system may provide suggested actions to fix errors in IVA understanding, may prioritize areas of language model repair, and may automate the review of conversations. By the use of an automated system for conversation review, problematic interactions can be surfaced without exposing the entire set of conversation logs to human reviewers, thereby minimizing privacy invasion. A scalable system processes conversations and autonomously marks the interactions where the IVA is misunderstanding the user.

In an implementation, a method comprises receiving conversation data; determining that the conversation data has a misunderstood intent; determining an action to adjust a language model responsive to determining that the conversation data has the misunderstood intent; and providing the suggested action to an output device or to the language model.

In an implementation, a system comprises one or more processors; storage storing conversation data representing at least one conversation, and one or more indicators of intent error; memory communicatively coupled to the one or more processors and storing executable instructions that, when executed by the one or more processors, cause the one or more processors to perform acts comprising: generating a risk score of a plurality of conversational turns in conversation data from conversations between a user and an intelligent virtual assistant; ranking the conversational turns by risk score for priority review; determining whether each of the conversational turns has a misunderstood intent; determining an action to adjust a language model responsive to determining whether each of the conversational turns has a misunderstood intent; and providing the suggested action to an output device or to the language model.

In an implementation, a method comprises processing conversation data with one or more natural language processing techniques to identify an intent for the conversation data, the intent being associated with a language model for the natural language processing techniques; determining, based at least in part on a presence of one or more indicators of intent error for the conversation data, a measure of confidence that the intent is correctly identified for the user input, and associating the measure of confidence with the conversation data; and determining an action to adjust the language model responsive the measure of confidence; and providing the action to an output device or to the language model.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 7 is a diagram of an example analysis interface for use by domain experts according to some implementations.

DETAILED DESCRIPTION

Figure 1:
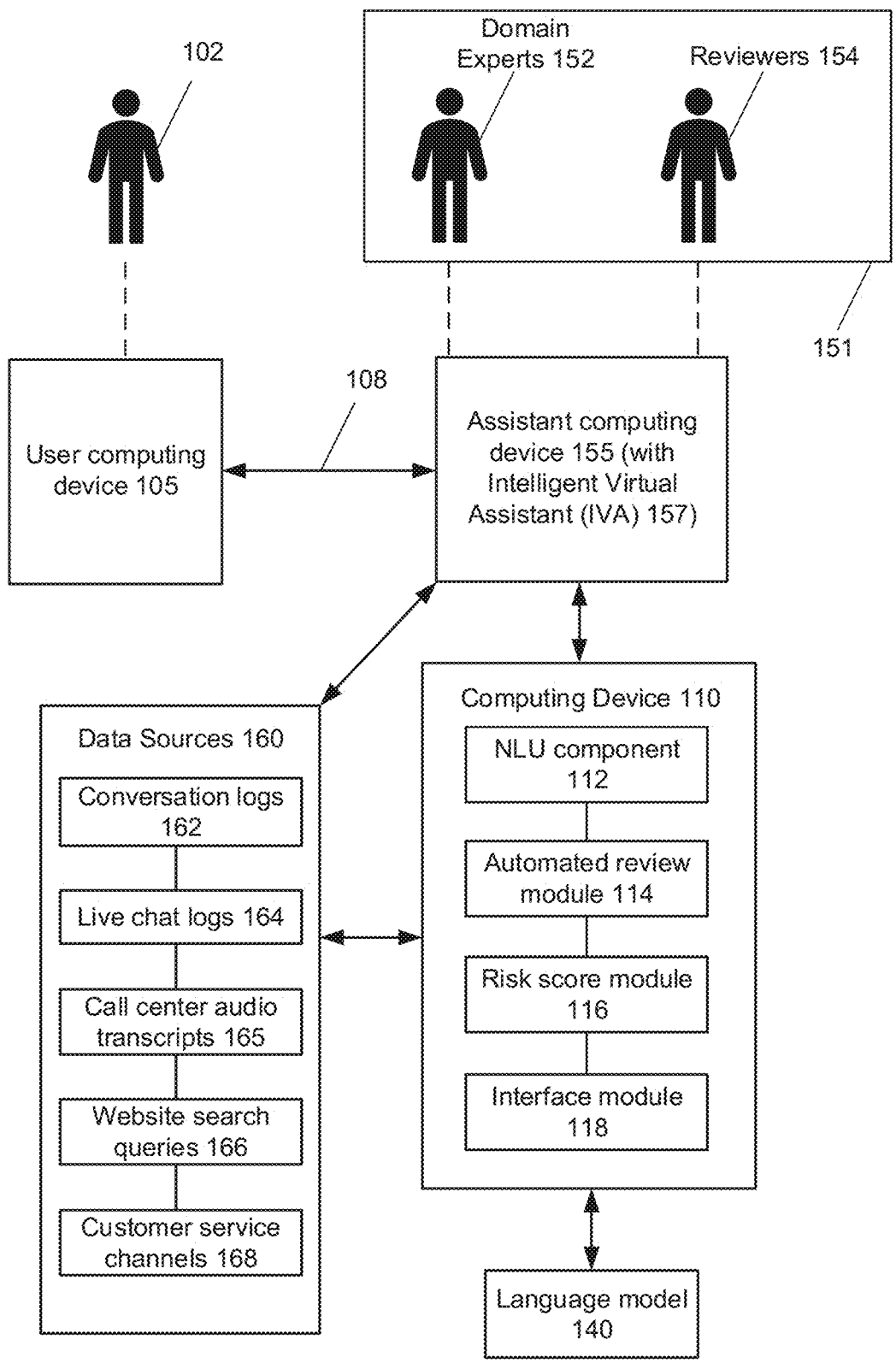
FIG. 1 is an illustration of an exemplary environment for automated conversation review to identify virtual assistant misunderstandings.

FIG. 1 is an illustration of an exemplary environment 100 for automated conversation review to identify virtual assistant misunderstandings. A user 102, using a user computing device 105, such as a smartphone, a tablet, or a laptop computer, communicates with an assistant computing device 155 associated with an entity 151 comprising one or more domain experts 152 and one or more reviewers 154 through a network 108 (e.g., the Internet). The entity 151 may be an individual or a business, company, or organization, for example, that provides a product or service, or access to a product or service, to the user 102.

The user 102 may communicate with the assistant computing device 155 via the user computing device 105 and an intelligent virtual assistant (IVA) 157 of the assistant computing device 155. The user computing device 105 (and thus the user 102) may interact with the IVA 157 using natural language processing (NLP) associated with, or implemented by, the IVA 157. Any known NLP methods may be used to interact with the user 102 and collect data pertaining to conversations, communications, and interactions between the user 102 (and the user computing device 105) and the IVA 157. The data may be stored in storage associated with one or more data sources 160.

Additionally, the user computing device 105, and thus the user 102, may interact with a computing device 110 of the entity, either directly through a network such as the network 108 or via the assistant computing device 155. The computing device 110 may be in communication with the assistant computing device 155 and/or the user computing device 105 to monitor the speech in a voice call (i.e., the conversation) or other communication between the user computing device 105 and the assistant computing device 155 (e.g., the IVA 157). The computing device 110 may be implemented in, or embodied in, a desktop analytics product or in a speech analytics product, in some implementations.

The computing device 110 may include a natural language understanding (NLU) component 112, an automated review module 114, a risk score module 116, and an interface module 118. In some implementations, the computing device 110 may be comprised within the assistant computing device 155. In some implementations, one or more of the NLU component 112, the automated review module 114, the risk score module 116, and the interface module 118 may be comprised within the assistant computing device 155 or another computing device (not shown).

The network 108 may be a variety of network types including the public switched telephone network (PSTN), a cellular telephone network, and a packet switched network (e.g., the Internet). Although only one user computing device 105, one assistant computing device 155, and one computing device 110 are shown in FIG. 1, there is no limit to the number of computing devices 105, 155, 110 that may be supported.

Figure 8:
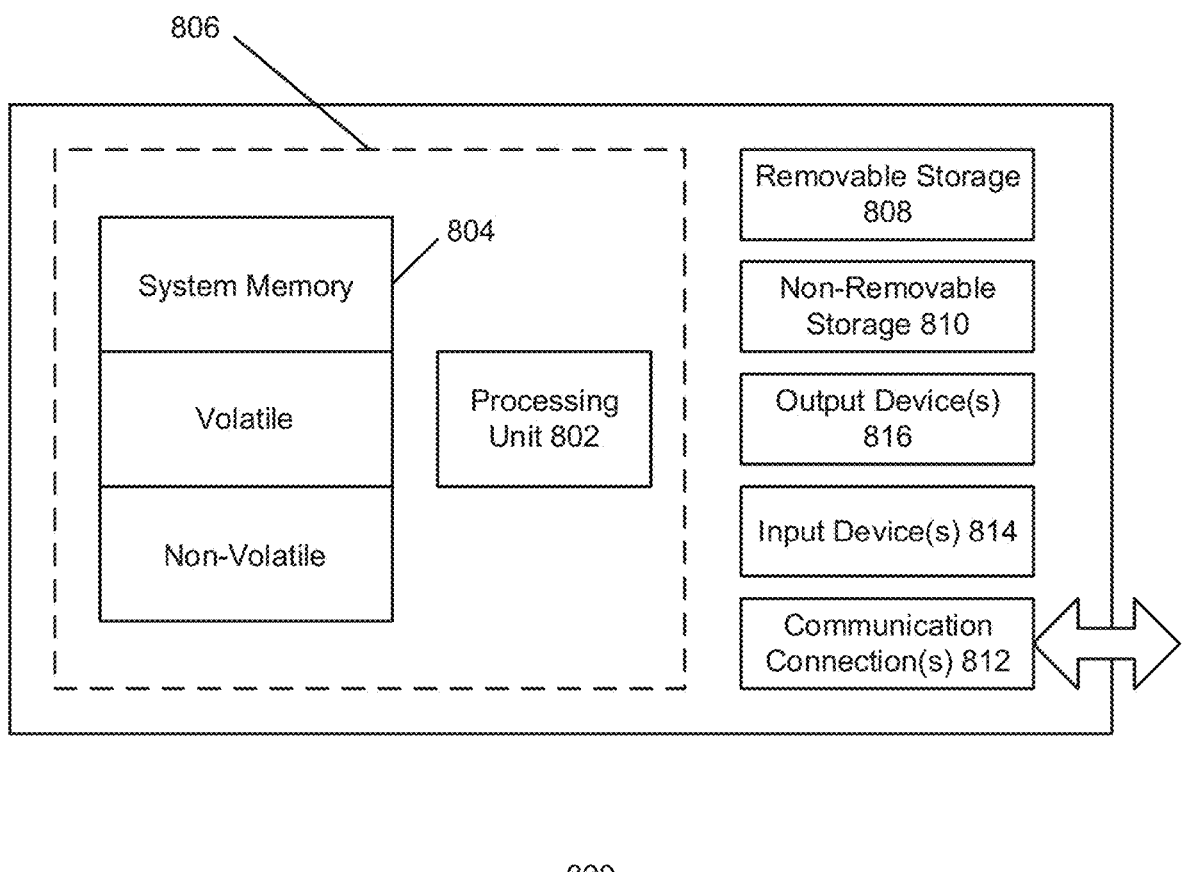
FIG. 8 shows an exemplary computing environment in which example embodiments and aspects may be implemented.

The user computing device 105, the assistant computing device 155, and the computing device 110, may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 8 as the computing device 800.

In some implementations, the computing device 110 is in communication with, and is configured to receive data from, one or more data sources 160. Some or all of the data in the data sources 160 may be data collected from user interaction with the IVA 157 and/or any gathered and/or processed data from the IVA 157 such as from artificial intelligence (AI), machine learning (ML), advanced speech technologies (such as NLU, NLP, natural language generation (NLG)), and simulated live and unstructured cognitive conversations for involving voice, text, and/or digital interactions, for example. The IVA 157 may cover a variety of media channels in addition to voice, including, but not limited to, social media, email, SMS/MMS, IM, etc.

The data sources 160 may comprise one or more of conversation logs 162, live chat logs 164, call center audio transcripts 165, website search queries 166, and customer service channels 168, for example.

With the rise of IVAs, there is a rise in efforts to identify conversations containing misunderstood user inputs. These conversations uncover errors in NLU and help prioritize and expedite improvements to the IVA. As human reviewer time is valuable and manual analysis is time consuming, prioritizing the conversations where misunderstanding has likely occurred reduces costs and speeds improvement. In addition, less conversations reviewed by humans mean less user data is exposed, increasing privacy. Scalable systems and methods disclosed herein for automated conversation review can identify potential miscommunications. The systems and methods provide users (e.g., IVA designers, administrators, etc.) with suggested actions to fix errors in IVA understanding, prioritizes areas of language model repair, and automates the review of conversations where desired. By the use of automated systems and methods for conversation review, problematic interactions can be surfaced without exposing the entire set of conversation logs to human reviewers, thereby minimizing privacy invasion.

Scalable systems and methods described herein process conversations and autonomously mark the interactions where the IVA is misunderstanding the user. The systems and methods provide cost savings to companies deploying IVAs by reducing the time human reviewers spend looking at conversations with no misunderstandings present. It also enables a shorter refinement cycle as problems are surfaced quickly and more reliably than a random sample or confidence metric based review.

The NLU component 112 maps user inputs, or conversational turns, to a derived semantic representation commonly known as the intent, an interpretation of a statement or question that allows one to formulate the 'best' response. The collection of syntax, semantics, and grammar rules that defines how input language maps to an intent within the NLU component 112 is referred to as a language model 140. The language model 140 may be trained through machine learning methods or manually constructed by human experts. Manually constructed symbolic models require humans to observe and formalize these language rules while machine-learned models use algorithms to observe and approximate them.

Regardless of implementation details, to improve the language models and for quality assurance, human-computer interactions need to be continuously reviewed. Improvements include the addition of vocabulary and new rules or the revision of existing rules that led to incorrect mappings within the language model 140. For machine-learned models, identification of incorrect understanding can highlight confusion within the model and prioritize areas of further training. The main focus of misunderstanding detection is on intent classification. It is in the NLU component 112 that the breakdown of communication will begin, assuming adequate Automatic Speech Recognition (ASR), if speech is used as an interface. The detection of ASR error and recovery is well known.

IVAs for customer service are deployed in a specific language domain such as transportation, insurance, product support, or finance, for example. In known IVA refinement processes, reviewers are given a sample of recent conversations collected from a live IVA for quality assurance. The reviewers need to be familiar with any domain specific terminology. This poses difficulty in the utilization of crowd-sourced platforms such as Figure Eight or Mechanical Turk because workers must be vetted to ensure they have proper knowledge of the domain and associated terminology. One technique is to create a series of tests that workers must pass before accessing the task. Another technique injects conversations with known labels to the sample and removes reviewers that score poorly on them.

With known refinement processes, the sample to be reviewed can be selected in a variety of ways. If a particular event is important to analyze, such as a user requesting an escalation to a human, all conversations containing the event are selected. Such samples are biased and may miss many other important failure scenarios, so for a more holistic view a random sample can be taken. Another technique selects interactions where the NLU and/or ASR confidence score is lower than some predetermined threshold. In this case, reviewers rely on the system itself to indicate where error lies. While low confidence is potentially more effective than a random sample at finding poor interactions, this requires trusting the very system that is being evaluated for errors. This also creates a dependency on the underlying system implementation that makes it difficult to compare the performance of different IVAs, or, if the system design is ever modified, the same IVA over time.

With known refinement processes, sampled conversations are manually graded in an effort to find intents which need improvement. The reviewers may use various grading means, but a star rating system such as one-to-five stars is common. The result of this review process is a set of conversations along with their grades which are passed to domain experts. Domain experts are typically trained in NLP and are responsible for the construction and modification of language models. Only poorly graded conversations require in-depth analysis by domain experts to determine the necessary changes to the language models. The faster this review-correction cycle completes, the more quickly the IVA can adapt to changes in domain language or product or website changes that require additional knowledge.

The methods and systems described herein are configured to predict and/or identify intent classification errors in conversational turns using the language model 140. This reduces the human burden and costs in maintaining conversational agents.

The automated review module 114 analyzes data from the data sources 160, such as the conversation logs 162, to identify conversations, where the IVA 157 is misunderstanding the user 102 (e.g., intent classification errors in the conversation). Although conversations between the user 102 and the IVA 157 (via the user computing device 105 and the assistant computing device 155, for example) are described herein, and more particularly conversational turns are described herein, it is contemplated that any user input and/or human-computer interactions may be analyzed and/or processed using the systems and methods described herein. Any one more of the data sources 160 may be analyzed and/or processed, depending on the implementation.

The risk score module 116 may determine and/or assign as score to each conversational turn that has been identified by the automated review module as being a possibly misunderstood interaction, using the techniques described herein. The risk score module 116 is used to generate a risk score per turn representing the risk of intent misclassification. This risk score is used to rank turns for priority review. In some implementations, humans such as the domain experts 152 and/or the reviewers 154 vote to determine whether each turn having a risk score above a certain predetermined (or dynamic, depending on the implementation) was misunderstood. Additionally or alternatively, depending on the implementation, the system 100 (e.g., the interface module 118) can also vote if the turn was misunderstood to reduce or eliminate the need for human voting. The voting outcomes generate suggested actions to fix the identified errors in the language model 140.

Thus, the automated review module 114 detects features of intent error and the risk score module 116 aggregates these features into a risk score. The risk score module 116 applies various heuristics and classifiers to detect indications of misunderstanding in each conversational turn and score them between [0; 1]. As each indication is independently scored, and each conversation is independent, this task may be done in parallel on a computer cluster for scalability, in some implementations.

Once each turn is annotated with all applicable risk indicators, the risk score for a particular turn is calculated as the weighted sum of all indicator scores in that turn. Weights are initialized to 0:5 and tuned over time using odds ratios. The odds ratio represents the odds that an outcome will occur given a particular exposure, compared to the odds of the outcome occurring in the absence of that exposure. As reviewers (such as the domain experts 152 and/or the reviewers 154) grade turn-intent mappings, the odds of each risk indicator predicting a misunderstanding is recalculated and the weight of that risk indicator is adjusted, improving the scoring model. As indicators may be domain-dependent, weights are adjusted per domain.

The interface module 118 is configured to allow one or more systems and/or one or more users, such as the domain experts 152 and/or the reviewers 154 to receive, analyze, and act on data outputted by the automated review module 114 and/or the risk score module 116.

In some implementations, the domain experts 152 create projects, linked to a live IVA, and select a time range over which to do analysis. Once they have defined a project and a time range for review, the interface module 118 prioritizes all conversational turns within that range by their risk score. Additionally or alternatively, in some implementations, the human reviewers 154 log into a project (a collection of conversations from a live IVA) and review turns that have been prioritized by risk score. They read each turn in the context of the conversation and vote on whether or not they agree with the intent chosen by the NLU component 112 (e.g., in the live IVA 157). If a reviewer does not feel they have enough information or domain knowledge to decide, they may also vote Unsure, for example. In some implementations, a turn is shown to a minimum of three reviewers to reduce subjectivity and provide domain experts with a sense of inter-reviewer agreement.

Figure 2:
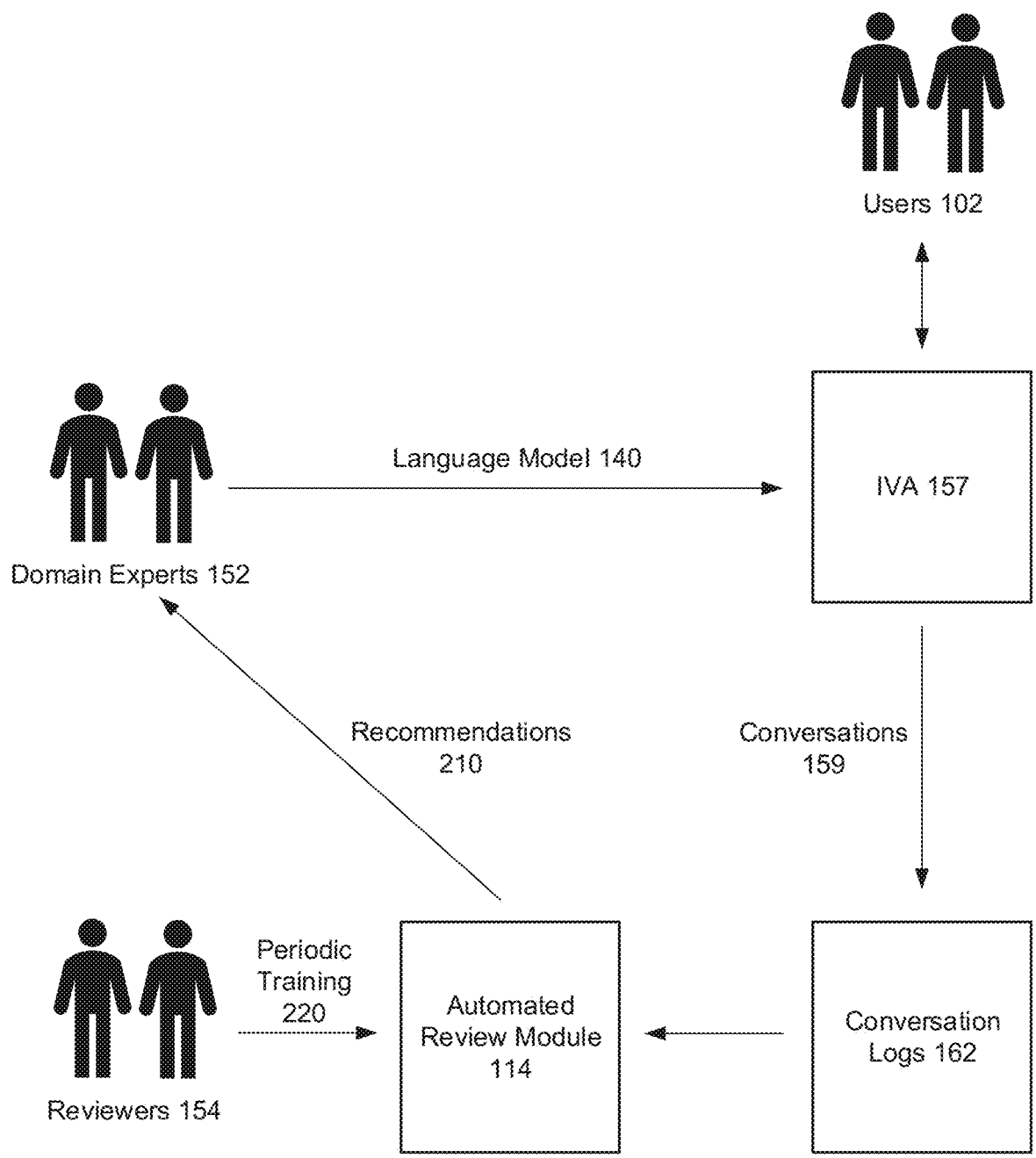
FIG. 2 is a diagram illustrating an exemplary flow for automated conversation review to identify virtual assistant misunderstandings.

FIG. 2 is a diagram illustrating an exemplary flow 200 for automated conversation review to identify virtual assistant misunderstandings. One or more users 102 have conversations comprising conversations turns with the IVA 157. The conversations 159 are stored in one or more conversation logs 162.

The conversation logs 162 are provided to, or accessed by, the automated review module 114. The reviewers 154 provide periodic training 220 to the automated review module using results from previous outputs of the automated review module 114 (based on outputs provided by the risk score module 116 and/or the interface module 118). The periodic training may be adjustments and/or refinements to processes and/or algorithms of the automated review module 114 that are used in detecting or otherwise determining features of intent error in the conversations logs 162.

The automated review module 114 (in conjunction with the risk score module 116 and/or the interface module 118 depending on the implementation) provides recommendations 210 to the domain experts 152. The recommendations 210 may be comprise actions and/or suggestions for the domain experts to implement with respect to the language model 140. In the manner, the language model 140 may be adjusted by the domain experts to provide more accurate interactions between the users 102 and the IVA 157.

Figure 3:
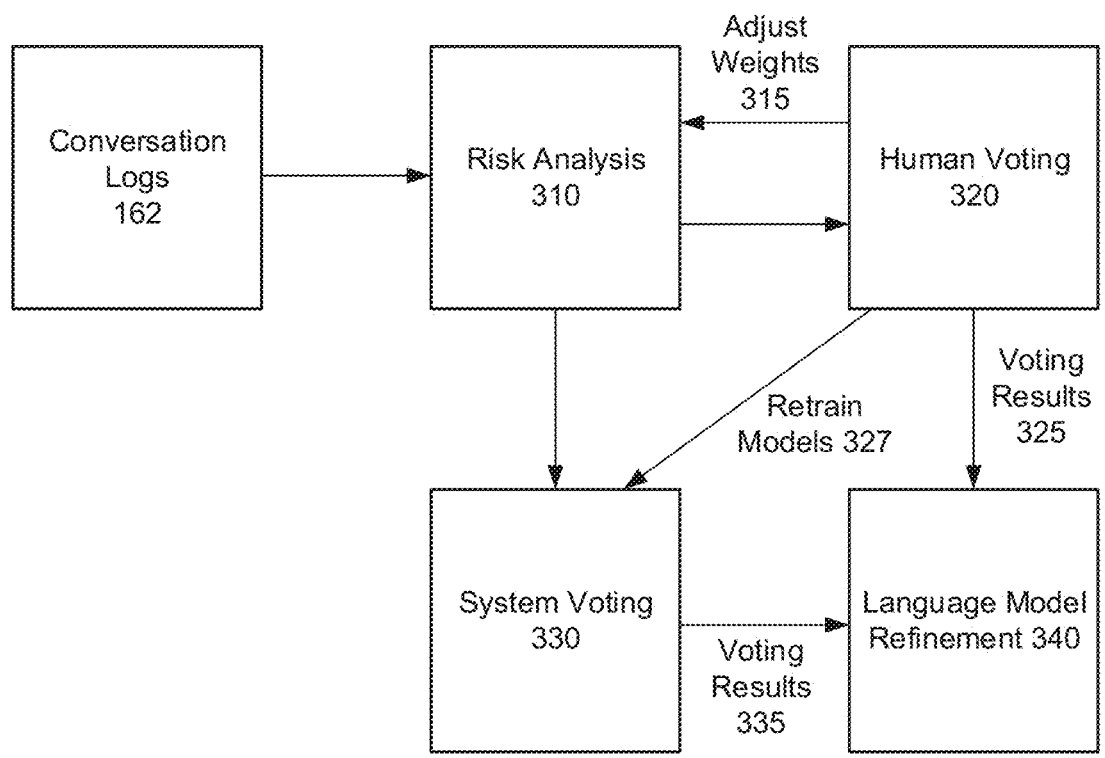
FIG. 3 is a diagram illustrating an exemplary data flow for automated conversation review to identify virtual assistant misunderstandings.

FIG. 3 is a diagram illustrating an exemplary data flow 300 for automated conversation review to identify virtual assistant misunderstandings. The conversation logs 162 (and/or other data sources of the data sources 160, for example) are used in risk analysis 310. The risk analysis may be performed by the risk score module 116 in some implementations.

In some implementations, the results of the risk analysis 310 may be provided to humans (e.g., the reviewers 154) for human voting 320 on whether the identified conversational turns having detected intent errors do actually contain intent errors or do not. The voting results 325 are used for language model refinement 340 in which the language model 140 may be adjusted to provide more accurate interactions between the users 102 and the IVA 157. Results of the human voting 320 may also be used to adjust weights in the risk analysis to provide improved risk analysis and risk scoring by the risk score module 116.

Alternatively or additionally, depending on the implementation, the results of the risk analysis 310 may be provided to a processor (e.g., the computing device) for system voting 330 for automated (non-human) determination on whether the identified conversational turns having detected intent errors do actually contain intent errors or do not. The voting results 335 are used for language model refinement 340 in which the language model 140 may be adjusted to provide more accurate interactions between the users 102 and the IVA 157.

In some implementations, the results of the human voting 320 are used to train one or more models 327 that are used in the system voting 330. This training of the model(s) provides more accurate voting results 335 and improved language model refinement 340.

Figure 4:
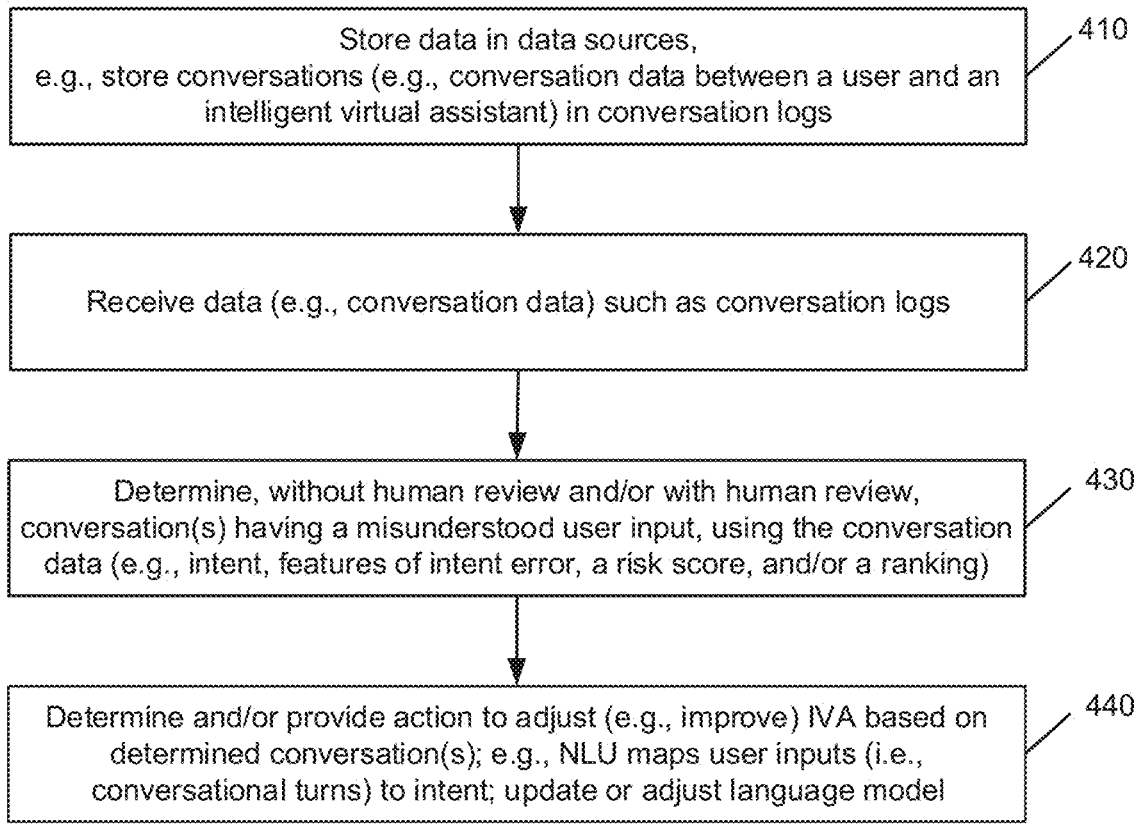
FIG. 4 is an operational flow of an implementation of a method for automated conversation review to identify virtual assistant misunderstandings.

FIG. 4 is an operational flow of an implementation of a method 400 for automated conversation review to identify virtual assistant misunderstandings. The method 400 may be performed using aspects of the environment 100 in some implementations.

At 410, data is stored in data sources (e.g., the data sources 160). For example, human-IVA conversations (e.g., conversation data between a user 102 and an IVA 157) are stored in the conversation logs 162 by the assistant computing device 155 and/or the computing device 110.

At 420, at a time for analysis, the data (e.g., conversation data) is retrieved or otherwise received from the data sources 160. In some implementations, the automated review module 114 retrieves and/or receives the conversation logs 162 or other data from the data sources 160 for subsequent analysis.

At 430, it is determined which conversations (e.g., conversational turns) have a misunderstood user input using the conversation data (e.g., using aspects such as intent, features of intent error, a risk score, and/or a ranking). Such determination may be made by the system without human review and/or may be made with human review. In some implementations, the automated review module 114 performs the determinations. In this manner, automated review is provided.

At 440, using the conversations that were determined to have a misunderstood user input, one or more actions are determined and/or provided to adjust (e.g., improve) the language model and thus the IVA. In some implementations, the NLU component 112 maps user inputs (e.g., conversational turns) to intent and the language model 140 is updated or adjusted accordingly based on this mapping.

Figure 5:
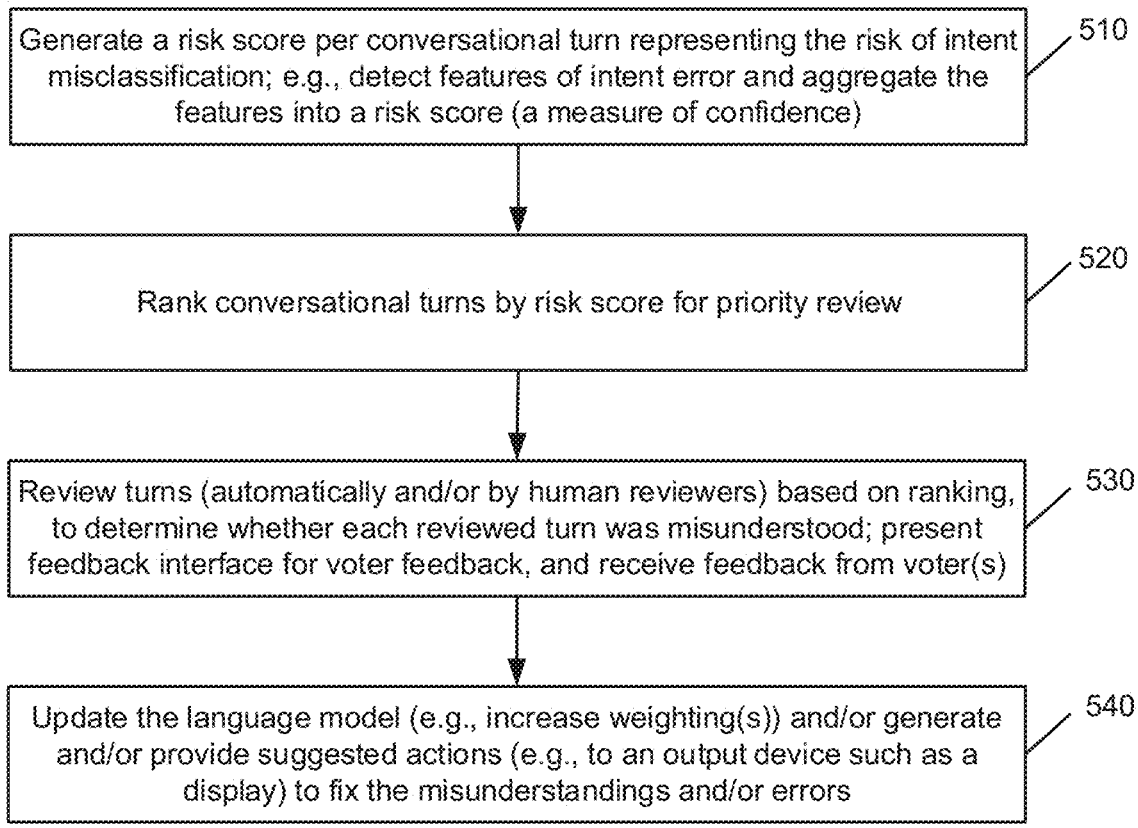
FIG. 5 is an operational flow of another implementation of a method for automated conversation review to identify virtual assistant misunderstandings.

FIG. 5 is an operational flow of another implementation of a method for automated conversation review to identify virtual assistant misunderstandings. The method 500 may be performed using aspects of the environment 100 in some implementations.

At 510, a risk score per turn (i.e., conversational turn) is generated that represents the risk of intent misclassification. For example, features of intent error are detected and these features are aggregated into a risk score. The risk score may be considered to be a measure of confidence that the intent has been (or has not been, depending on the implementation) misunderstood. In some implementations, this operation is performed by the risk score module 116.

At 520, the conversational turns are ranked by risk score for priority review. The ranking may be in an order based on the risk score for each turn, with the turns having the higher risk scores being ranked higher than the turns having the lower risk scores. For example, the turn having the highest risk score may be ranked as having the highest priority for review, while the turn having the lowest risk score may be ranked as having the lowest priority for review.

At 530, the turns are reviewed based on the ranking to determine whether each reviewed turn was misunderstood (e.g., had a misunderstood intent) by the IVA. The reviewing may be automated (e.g., performed by a computing device such as the computing device 110) and/or may be performed by humans, such as the reviewers 154. A feedback interface (e.g., a voting interface) may be presented to a reviewer for voter feedback. The feedback interface may receive feedback form the voters (e.g., the reviewers 154)

At 540, a language model, such as the language model 140, is updated and/or generated. In some implementations, weightings (also referred to herein as weights) may be increased. Additionally or alternatively, suggested actions may be generated and provided (e.g., to a user) to fix or otherwise address the misunderstandings and/or errors.

In some implementations, automated reviewer voting is provided. To do this, train a binary classifier to vote Yes or No for each <turn, intent> pair identical to the reviewer task. Humans may not be entirely replaced however, as the risk indicator weights and voting classifier may benefit from periodic retraining to account for changes in the set of intents within the language model.

To select the voting classifier, an extensive evaluation of various classification methods on each dataset is performed. The voting classifiers are trained using the unweighted risk indicator values as features and the majority decision as the outcome. If voters agree that turn t belongs to the intent assigned by the IVA, the class is 1. If they disagree, the class is 0. For each turn with a voter consensus, add a row to a feature matrix M, with a column for each risk indicator and a final column for the class.

$$M = \begin{array}{c} \\ t_1 \\ t_2 \\ \vdots \\ t_n \end{array} \begin{pmatrix} \text{backstory} & \text{restated} & & \text{class} \\ 0 & 1 & \ldots & 1 \\ 0 & 0 & \ldots & 0 \\ \vdots & \vdots & \ddots & \vdots \\ 1 & 0 & \ldots & 1 \end{pmatrix}$$

This feature matrix M is then used to train a binary classification model using a stratified 30-fold cross validation. When a new turn is under review, the risk indicators present are represented as a vector and fed to a voting classifier to predict the majority vote of Yes or No. The classifiers are trained and evaluated on each dataset in isolation. The classification method with the highest combined precision across all three datasets and fastest training time training time is chosen. Training time and scaling are important considerations as the models are retrained per dataset as human voting data is added. In some implementations, the voting classifier may be a Random Forest model, Support Vector Machine, or Neural Network.

Figure 6:
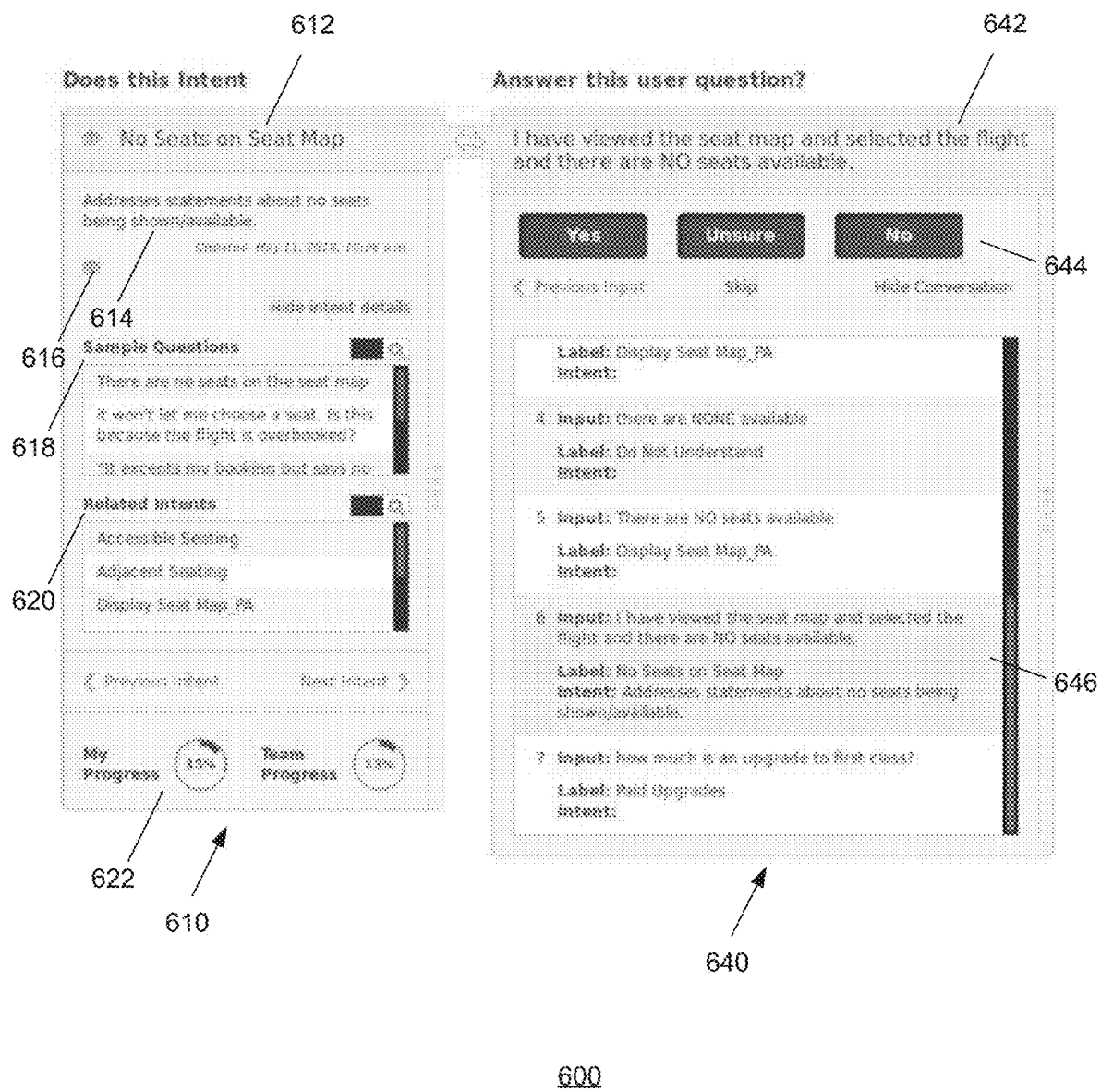
FIG. 6 is a diagram of an example voting interface for use by reviewers according to some implementations.

FIG. 6 is a diagram of an example voting interface 600 for use by reviewers according to some implementations. The example voting interface 600 is shown as a screen shot of a reviewer interface that may be displayed to one or more reviewers 154.

In the left-hand column 610, the intent 612 the reviewer is currently voting on is displayed along with additional information to give insight. The label of the intent 612 is displayed at the top, followed by a text description 614 of its purpose, which is maintained by the domain experts 152. If the reviewers 154 do not fully understand the purpose of an intent, they can submit questions to the domain experts 152 by clicking on the comment bubble 616 below the description text. The experts can then update the description 614 to clarify the purpose of the intent 612 so that voting is accurate.

Next, a set of sample questions 618 that have been previously human-validated to belong to this intent 612 are displayed. This is to give the reviewer some intuition on the language intended for the current intent 612. Following that is a list of related intents 620 to help the reviewer decide if a more suitable intent exists in the language model 140. Both lists are searchable to speed analysis. Controls to navigate through the intents to be reviewed are provided. At the bottom, metrics 622 on how many turns have been completed by the current reviewer and all reviewers combined on the displayed intent are shown.

On the right-hand side 640, the user turn 642 is shown followed by voting buttons 644. Keyboard shortcuts are provided to speed voting. The entire conversation with the current turn highlighted 646 is displayed to give the reviewer the conversational context needed to determine if the responding intent was appropriate. Notice that nowhere does the actual response text from the IVA appear. The response is not shown in order to separate the evaluation of the NLU component from that of the natural language generation (NLG) component (not shown). Because evaluation and improvement of the language model is desired, this isolation is useful. Once it has been established that the NLU is performing acceptably, the NLG can be evaluated separately, if desired.

FIG. 7 is a diagram of an example analysis interface 700 for use by domain experts according to some implementations. The example analysis interface 700 is shown as a screen shot of an analysis interface that may be displayed to one or more domain experts 152. The analysis interface 700 may be used by the domain experts 152 to view voting results and reviewer agreement.

After the risk analysis and voting processes are complete, voting data and additional recommendations are provided to the domain experts 152 to facilitate development and/or adjustment of the language model 140. To optimize domain experts' time, the reviewer voting outcomes are used to determine a recommended action per turn, shown in Table 1 and visualized in FIG. 7. These actions help the domain experts 152 quickly determine what to do with the voting results for a particular turn.

TABLE 1

Voting outcomes and recommended actions

| Circumstance | Recommended Action |
|---|---|
| A turn-to-intent map is voted to be correct | None. These are added as training and regression samples |
| A turn-to-intent map is voted to be incorrect | Fix or retrain the language model to prevent the turn from reaching the associated intent |
| The reviewer majority votes Not Sure | Determine if the intent was appropriate for the turn or if a new intent should be created |
| There is no reviewer consensus | Determine if the intent was appropriate for the turn or if a new intent should be created |
| Voters are conflicted as they approved the turn in more than one intent | Clarify definitions of both intents and re-release for voting |

In some implementations, to prioritize language model repair work by the impact it will have on the live IVA, the set of turns and their voting outcomes are first grouped by responding intent and then ordered by the frequency of response within the conversation logs. The ratio of misunderstood to correct inputs per intent may be determined and provided to prioritize work. This prioritization from the analysis interface may be displayed or otherwise outputted or provided to a user such as a reviewer or a domain expert. For example, with this information, domain experts can quickly determine which malfunctioning intents have a greater impact on user experience. If two intents have a similar ratio of misunderstood inputs, the intent with the higher response frequency would be prioritized for repair as its malfunction will have a larger impact on overall user experience.

To help domain experts quickly analyze the voting results and voter consensus, the analysis interface 700 provides the tabular view shown in FIG. 7. Filters may be implemented to provide the ability to explore the results from many angles such as per intent, per voter, date range, recommended action, etc. In the left hand column 710, the original user turn text is displayed. In the next column 720 is the intent that the reviewers evaluated the text against. The "Input Type" column 730 shows whether the intent evaluated was from the current NLU or a different source, such as regression tests used in developing the language model or live chat logs. Misunderstanding analysis may be performed on any textual data labeled with intent or topic. The "Voting Results" column 740 provides a visual indicator of the voting outcome and inter-reviewer agreement. The final column 750 on the right hand side is the recommended action, e.g., from Table 1. Filtering this table by an action type will quickly surface all turns where a particular action should be performed.

From this view, the domain experts 152 can quickly find areas of the language model 140 that need attention and export the text data with any detected risk indicators and voting results. They can then use this data along with the NLU-specific means to make desired changes, updates, and/or improvements in the language model 140.

Thus, the systems and methods described herein improve IVAs by prioritizing human reviewer time and reduces annotation costs associated with maintaining production IVAs at scale. In addition, by minimizing the amount of human review necessary, the amount of user data exposed through the review process is greatly reduced. The vast majority of conversations are not seen by humans, while still ensuring IVA quality.

The systems and methods described herein can help domain experts prioritize their time for language model repairs that will have the largest impact on user experience.

In some implementations, the systems and methods described herein present voting results and actions to the domain experts through the same interface regardless if the voter was human or machine and votes on every turn. Therefore, the source of votes can be chosen based on current system performance in a particular language domain or human reviewer availability. The system may be implemented as a web application, so domain experts can easily use internal or external annotation sources for voting.

In some implementations, the systems and methods described herein use only conversational features for misunderstanding detection and is not dependent on the implementation details of the underlying IVA or the domain of language it is deployed in.

Indicators of intent error that the automated review module 114 and/or the risk score module 116 test for in some implementations include conversation level features and turn level features.

Conversation level features apply risk equally across all turns within the single conversation where they are present. These features are used to detect miscommunication over the course of the conversation and elevate the risk score for turns in conversations where miscommunication was likely to have occurred. Conversation level features include, for example, I Don't Know (IDK) in conversation, same intent(s) hit, tie in conversation, user rating scores, conversation should escalate, and sentiment change over time.

An IDK occurs when the language model does not find an intent that satisfies the user query with a high enough confidence. The IVA may respond with something like "I'm sorry, I didn't understand you." If a conversation contains one or more IDK responses, this may indicate that the user is talking about some subject the IVA has no knowledge of.

The same intent is hit more than once within the conversation. This is an indication of risk within a customer service conversation because it is unlikely the user would want to see the same response repeated. If these are successive in a conversation, they are considered to be sequential hits. This usually indicates that the response to the first input did not satisfy the user; he or she is rewording the question to get a different response. If the system has the initiative, this may mean that the system is repeating a prompt, a common indication of miscommunication.

A tie in conversation means the responding intent for one or more turns in the conversation had a nearly identical score as one or more different intents. This indicates confusion in the NLU component around the input language for the tying intents. If a conversation contains such ties it may surface subject matter that is not well defined in the language model.

Regarding user rating scores, users may be asked for feedback on how helpful the IVA was for their session. However, feedback is not entirely reliable because some users give negative feedback if the IVA rightly upholds business rules. For example, business rules may prevent transferring a ticket to a different passenger, and, when a user attempts to do so, the IVA will not let them. In retribution, the user grades the conversation poorly but the IVA was not at fault. The user may also say the IVA was unhelpful when the NLU component was indeed working correctly, but the response text was poorly worded. Therefore, this feedback is only a measure of risk in the system and not the final determination.

An escalation occurs when a user requests an alternative channel for the completion of a task. Whether or not there was explicit user request for an escalation in the conversation, an algorithm may be used to determine that the conversation should have been escalated due to IVA failures to complete the task at hand.

Regarding sentiment change over time, the user began the conversation with positive or neutral sentiment, but by the end of the conversation their sentiment was negative. This may be caused by either the IVA preventing them from completing a task due to business rules, or due to IVA misunderstanding.

Turn level features only apply risk to a single turn. However, they may still use features of the conversational context in their determination. Turn level features include, for example, triggers IDK response, contains backstory, precedes corrections, abandonment, contains multiple intents, triggers sequential hit or impasse, precedes escalation, precedes unhelpful, precedes profanity, precedes negative sentiment, restated, precedes IDK, triggers tie, contains unknown words, and should escalate point.

If the response to this turn is an IDK, this may indicate that the user has asked about a subject the IVA does not have knowledge of, and thus it triggers IDK response.

Regarding contains backstory, users may give backstory on their task that is unnecessary for determining the correct intent. The presence of this language can add confusion in the NLU and result in an intent error. For example, a user may tell the IVA that he or she needs to fly to Boston for a son's graduation party. The fact that the user has a son and is attending his graduation party is irrelevant to the task. The additional language can interfere with determining the user's primary task of booking a flight. Intents may be segmented in the text, and if the NLU component is unable to determine the intent of a segment, consider it the presence of out-of-domain/unnecessary language.

Regarding precedes corrections, the following user turn contains error correction language, such as "no, . . . ", "I said . . . ", " . . . not what I . . . ", for example.

Abandonment refers to the user left the conversation immediately after the IVA asked them a question. This indicates that the IVA did not have all the information it needed to complete the task, but the user abandonment indicates it was likely trying to accomplish the wrong task and the user left in frustration.

Contains multiple intents refers to if multiple intents are present it can add confusion to the NLU. Assume the IVA under review does not support multiple intents within a single turn as multi-intent parsing is still an unsolved problem for IVAs. Using known methods, detect if multiple intents are present in the user turn.

Regarding triggers sequential hit or impasse, the turn hit the same intent as the previous turn. This usually indicates that the previous response did not satisfy the user, so he or she is rewording the question to get a different response but failed to do so. An impasse occurs when the same intent is returned more than two times in a row, in which case the IVA may respond with something like "I think you are asking for more information than I have."

Precedes escalation refers to as escalations may be due to previous IVA failures, risk is assigned to the turn preceding any escalation request.

Precedes unhelpful refers to the input directly preceded a turn stating the unhelpfulness of the IVA. This is a common reaction when the user is frustrated at the inability to make progress in their task.

Precedes profanity refers to the input directly preceded an interaction containing profanity. With a customer service or product support IVA, profanity is usually a sign of user frustration or irritation.

Precedes negative sentiment refers to if a turn contains negative sentiment, this may be due to the user's reaction to the previous IVA response. Therefore, risk is assigned to the preceding user turn.

Restated refers to if a turn is very similar to one or more following turns, this may indicate the user was dissatisfied with the response and rewords the question. Similarity is defined as a rephrasing of the same question or statement as measured by cosine similarity of sentence vectors; it may not have triggered the same intent in the IVA.

IDKs may follow misunderstood turns. This type of IDK can happen when the user reacts in surprise or frustration ("What??") or changes the subject to complaining about the IVA due to the misunderstanding ("This is the dumbest thing I have ever used!"), and is referred to as precedes IDK.

Triggers tie refers to the responding intent had a nearly identical score as one or more different intents. This indicates confusion in the language model around the input language.

Regarding contains unknown words, the user turn contains words that are out of vocabulary for the underlying language model. This may indicate that the user is talking about some subject the IVA does not have knowledge of.

Regarding should escalate point, there was no explicit user request for escalation in the conversation, but it is determined that the conversation should have escalated at this point in the conversation due to task failures.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a method is provided. The method includes receiving conversation data; determining that the conversation data has a misunderstood intent; determining an action to adjust a language model responsive to determining that the conversation data has the misunderstood intent; and providing the suggested action to an output device or to the language model.

Implementations may include some or all of the following features. The conversation data is from conversations between a user and an intelligent virtual assistant. Determining that the conversation data has the misunderstood intent is performed without human review. Determining that the conversation data has the misunderstood intent comprises generating a risk score of a plurality of conversational turns in the conversation data and ranking the conversational turns by risk score for priority review. Determining that the conversation data has the misunderstood intent comprises detecting a plurality of features of intent error and aggregating the features into the risk score. The method further comprises reviewing the conversational turns based on ranking to determine whether each reviewed turn was misunderstood. The method further comprises adjusting the language model based on the action. Adjusting the language model comprises adjusting an intelligent virtual assistant.

Implementations may also include some or all of the following features. The method further comprises processing the conversation data with one or more natural language processing techniques to identify an intent for the conversation data, the intent being associated with a language model for the natural language processing techniques. The method further comprises determining, based at least in part on a presence of one or more indicators of intent error for the conversation data, a measure of confidence that the intent is correctly identified for the user input, and associating the measure of confidence with the conversation data. The method further comprises receiving a selection of the intent to obtain feedback regarding the intent; presenting a feedback interface that enables a voter to provide feedback regarding matching of the conversation data to the intent; receiving feedback for the voter regarding an accuracy of matching the conversation data to the intent; evaluating the intent based at least in part on the feedback; determining that the feedback indicates that the matching of the conversation data to the intent is not accurate; increasing a weighting to be applied to the one or more indicators of intent error based at least in part on the determining that the feedback indicates that the matching of the conversation data to the intent is not accurate; and applying the weighting to the one or more indicators of intent error. The feedback includes a vote indicating whether or not the conversation data matches the intent.

In an implementation, a system is provided. The system includes one or more processors; storage storing conversation data representing at least one conversation, and one or more indicators of intent error; memory communicatively coupled to the one or more processors and storing executable instructions that, when executed by the one or more processors, cause the one or more processors to perform acts comprising: generating a risk score of a plurality of conversational turns in conversation data from conversations between a user and an intelligent virtual assistant; ranking the conversational turns by risk score for priority review; determining whether each of the conversational turns has a misunderstood intent; determining an action to adjust a language model responsive to determining whether each of the conversational turns has a misunderstood intent; and providing the suggested action to an output device or to the language model.

Implementations may include some or all of the following features. Determining whether each of the conversational turns has a misunderstood intent is performed without human review. Determining whether each of the conversational turns has a misunderstood intent comprises detecting a plurality of features of intent error and aggregating the features into the risk score. The acts further comprise reviewing the conversational turns based on ranking to determine whether each reviewed turn was misunderstood. The acts further comprise adjusting the language model based on the action, wherein adjusting the language model comprises adjusting an intelligent virtual assistant.

In an implementation, a method is provided. The method includes processing conversation data with one or more natural language processing techniques to identify an intent for the conversation data, the intent being associated with a language model for the natural language processing techniques; determining, based at least in part on a presence of one or more indicators of intent error for the conversation data, a measure of confidence that the intent is correctly identified for the user input, and associating the measure of confidence with the conversation data; and determining an action to adjust the language model responsive the measure of confidence; and providing the action to an output device or to the language model.

Implementations may include some or all of the following features. The method may further comprise: receiving a selection of the intent to obtain feedback regarding the intent; presenting a feedback interface that enables a voter to provide feedback regarding matching of the conversation data to the intent; receiving feedback for the voter regarding an accuracy of matching the conversation data to the intent; evaluating the intent based at least in part on the feedback; determining that the feedback indicates that the matching of the conversation data to the intent is not accurate; increasing a weighting to be applied to the one or more indicators of intent error based at least in part on the determining that the feedback indicates that the matching of the conversation data to the intent is not accurate; and applying the weighting to the one or more indicators of intent error. The feedback includes a vote indicating whether or not the conversation data matches the intent.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:

receiving conversation data between a user and an intelligent virtual assistant, wherein the conversation data comprises a plurality of conversational turns;

identifying an intent for the conversation data, the intent being associated with a language model for natural language processing techniques;

generating a risk score for each of the plurality of conversational turns, wherein the risk score represents a risk of intent misclassification, wherein generating the risk score for each conversational turn comprises:

detecting a plurality of indications of misunderstanding in the conversational turn;

determining a plurality of indicator scores for the conversational turn by scoring each of the indications of misunderstanding of the plurality of indications of misunderstanding with an indicator score; and determining the risk score for the conversational turn as the weighted sum of all the indicator scores in that conversational turn;

determining, using the intent and the risk score for each of the plurality of conversational turns, that the conversation data has a misunderstood intent;

determining an action to adjust the language model responsive to determining that the conversation data has the misunderstood intent; and adjusting the language model using the action.

2. The method of claim 1, wherein the determining that the conversation data has the misunderstood intent is performed without human review.

3. The method of claim 1, wherein determining that the conversation data has the misunderstood intent comprises ranking the conversational turns by risk score for priority review.

4. The method of claim 3, wherein determining that the conversation data has the misunderstood intent comprises detecting a plurality of features of intent error and aggregating the features into the risk score.

5. The method of claim 3, further comprising reviewing the conversational turns based on ranking to determine whether each reviewed turn was misunderstood.

6. The method of claim 1, wherein adjusting the language model comprises adjusting the intelligent virtual assistant.

7. The method of claim 1, further comprising processing the conversation data with one or more natural language processing techniques to identify the intent for the conversation data.

8. The method of claim 7, further comprising determining, based at least in part on a presence of one or more indicators of intent error for the conversation data, a measure of confidence that the intent is correctly identified for the user input, and associating the measure of confidence with the conversation data.

9. The method of claim 8, further comprising:

receiving a selection of the intent to obtain feedback regarding the intent;

presenting a feedback interface that enables a voter to provide feedback regarding matching of the conversation data to the intent;

receiving feedback for the voter regarding an accuracy of matching the conversation data to the intent;

evaluating the intent based at least in part on the feedback;

determining that the feedback indicates that the matching of the conversation data to the intent is not accurate;

increasing a weighting to be applied to the one or more indicators of intent error based at least in part on the determining that the feedback indicates that the matching of the conversation data to the intent is not accurate; and applying the weighting to the one or more indicators of intent error.

10. The method of claim 9, wherein the feedback includes a vote indicating whether or not the conversation data matches the intent.

11. A system comprising:

one or more processors;

storage storing conversation data representing at least one conversation between a user and an intelligent virtual assistant, wherein the conversation data comprises a plurality of conversational turns, and one or more indicators of intent error;

memory communicatively coupled to the one or more processors and storing executable instructions that, when executed by the one or more processors, cause the one or more processors to perform acts comprising:

receiving the conversation data between the user and the intelligent virtual assistant;

identifying an intent for the conversation data, the intent being associated with a language model for natural language processing techniques;

generating a risk score for each of the plurality of conversational turns, wherein the risk score represents a risk of intent misclassification, wherein generating the risk score for each conversational turn comprises:

detecting a plurality of indications of misunderstanding in the conversational turn;

determining a plurality of indicator scores for the conversational turn by scoring each of the indications of misunderstanding of the plurality of indications of misunderstanding with an indicator score; and determining the risk score for the conversational turn as the weighted sum of all the indicator scores in that conversational turn;

ranking the conversational turns by risk score for priority review;

determining, using the intent and the risk score for each of the plurality of conversational turns, that the conversation data has a misunderstood intent;

determining an action to adjust the language model responsive to determining that the conversation data has a misunderstood intent; and adjusting the language model using the action.

12. The system of claim 11, wherein the determining that the conversation data has the misunderstood intent is performed without human review.

13. The system of claim 11, wherein determining that the conversation data has the misunderstood intent comprises detecting a plurality of features of intent error and aggregating the features into the risk score.

14. The system of claim 11, wherein the acts further comprise reviewing the conversational turns based on ranking to determine whether each reviewed turn was misunderstood.

15. The system of claim 11, wherein adjusting the language model comprises adjusting the intelligent virtual assistant.

16. A method comprising:

receiving conversation data between a user and an intelligent virtual assistant, wherein the conversation data comprises a plurality of conversational turns;

identifying an intent for the conversation data, the intent being associated with a language model for natural language processing techniques identifying an intent for the conversation data by processing the conversation data with one or more of the natural language processing techniques;

generating a risk score for each of the plurality of conversational turns, wherein the risk score represents a risk of intent misclassification, wherein generating the risk score for each conversational turn comprises:
  detecting a plurality of indications of misunderstanding in the conversational turn;
  determining a plurality of indicator scores for the conversational turn by scoring each of the indications of misunderstanding of the plurality of indications of misunderstanding with an indicator score; and
  determining the risk score for the conversational turn as the weighted sum of all the indicator scores in that conversational turn;

determining, using the intent and the risk score for each of the plurality of conversational turns, that the conversation data has a misunderstood intent;

determining, based at least in part on a presence of one or more indicators of intent error for the conversation data, a measure of confidence that the intent is correctly identified for the user input, and associating the measure of confidence with the conversation data; and determining an action to adjust the language model responsive to the measure of confidence and responsive to determining that the conversation data has the misunderstood intent; and adjusting the language model using the action.

17. The method of claim 16, further comprising:

receiving a selection of the intent to obtain feedback regarding the intent;

presenting a feedback interface that enables a voter to provide feedback regarding matching of the conversation data to the intent;

receiving feedback for the voter regarding an accuracy of matching the conversation data to the intent;

evaluating the intent based at least in part on the feedback;

determining that the feedback indicates that the matching of the conversation data to the intent is not accurate;

increasing a weighting to be applied to the one or more indicators of intent error based at least in part on the determining that the feedback indicates that the matching of the conversation data to the intent is not accurate; and applying the weighting to the one or more indicators of intent error.

18. The method of claim 17, wherein the feedback includes a vote indicating whether or not the conversation data matches the intent.

* * * * *